Dec. 2, 1969   A. E. SCHMIDLIN   3,481,205
FLUERIC VALVE ELEMENT
Filed Oct. 17, 1966

INVENTOR.
ALBERTUS E. SCHMIDLIN
BY

ATTORNEY

United States Patent Office 3,481,205
Patented Dec. 2, 1969

3,481,205
FLUERIC VALVE ELEMENT
Albertus E. Schmidlin, Caldwell, N.J., assignor to Singer-General Precision, Inc., a corporation of Delaware
Filed Oct. 17, 1966, Ser. No. 587,112
Int. Cl. G01p 15/00
U.S. Cl. 73—515                                    3 Claims

ABSTRACT OF THE DISCLOSURE

A fluid flow control device comprising an enclosure having a fluid inlet and outlet, a fluid permeable partition in the enclosure between its inlet and outlet, and liquid in the enclosure disposed between the partition and the enclosure outlet. The partition contains multiple apertures not larger than a predetermined maximum size which is such, with respect to the physical characteristics of the liquid and the maximum pressure differential across the partition, that the liquid will be precluded from passing through the partition.

---

Figure 1:
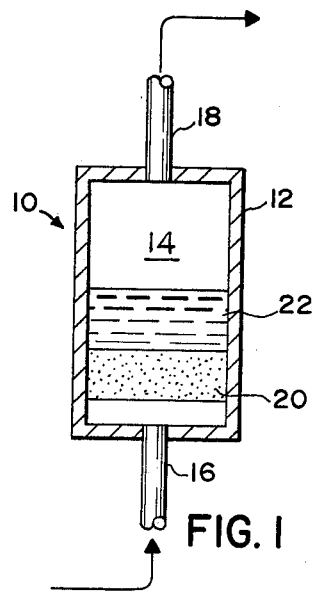

This invention relates to fluid control elements and, in particular, to unidirectional valve devices useful as diodes in pneumatic computer circuits.

In certain fields of utility, the existence or possible occurrence of hostile ambient conditions, such as nuclear radiation, extreme temperatures, thermal and mechanical shock, has generated the need for pneumatic computers as substitutes for electronic computers which are highly vulnerable to such conditions.

In order to produce a pneumatic computer which is both reliable and relatively insensitive to hostile environments, it is highly desirable to avert entirely the use of components embodying moving parts. To this end, a number of pure fluid, i.e., "flueric," analogs of electronic computer components have been developed, including fluid (more specifically, pneumatic) diodes. However, these diodes suffer from an important disadvantage in that they permit a substantial amount of reverse flow and, therefore, they do not equal the performance of pneumatic diodes having moving parts, e.g., a pneumatic ball check valve.

While the devices contemplated by the present invention and described hereinbelow may find primary utilization as one way flow control elements, it will be understood and become more apparent as this specification proceeds that other applications of the inventive concept are both numerous and diverse, for example, in pressure sensors or transmitters, pressure relief valves, and/ or acceleration sensors.

With this state of the art in mind, it is a primary general object of this invention to provide a flow control element which overcomes or mitigates the problems extant in the prior art as outlined above.

A more specific object is the provision of a novel one-way fluid valve element which comprises no mechanical moving parts and permits substantially zero flow in the reverse direction.

Another object is the provision of a pneumatic valve for flueric systems which is simple in construction, reliable in operation and resistant to nuclear radiation, extremes of temperature and to thermal and mechanical shock.

A further object of the invention is to provide a novel flueric acceleration sensor which yields output signals in the form of fluid pressures.

To the fulfillment of these and further objects, the present invention contemplates a fluid flow control device comprising an enclosure having a fluid inlet and outlet; a fluid permeable partition in the enclosure between its inlet and outlet; and liquid in the enclosure disposed between the partition and the enclosure outlet. The partition contains multiple apertures not larger than a predetermined maximum size which is such, with respect to the physical characteristics of the liquid and the maximum pressure differential across the partition, that the liquid will be precluded from passing through the partition.

Figure 2:
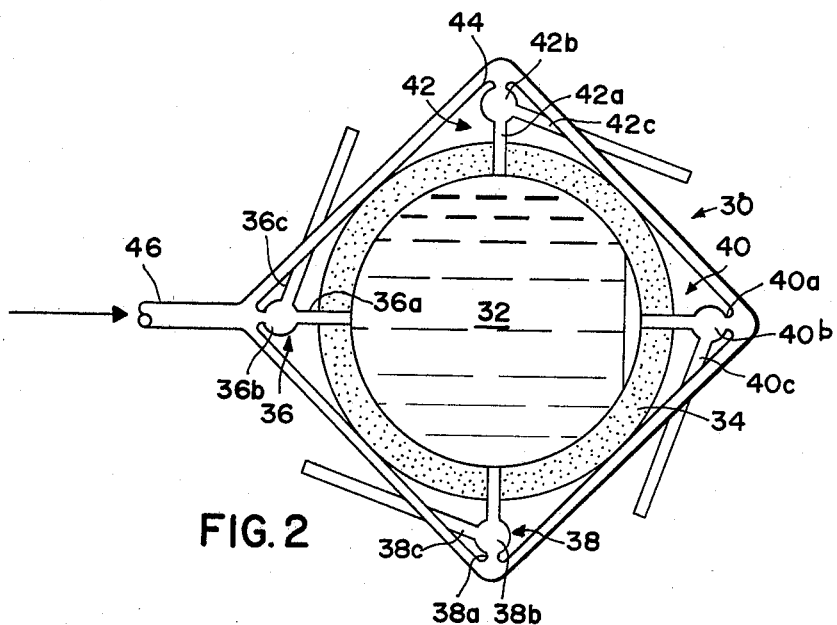

Additional objects of the invention, its advantages, scope and the manner in which it may be carried out will be more fully comprehensible to persons conversant with the art from the following description taken in conjunction with the subjoined claims and the annexed drawing, in which:

FIGURE 1 illustrates, somewhat schematically, an axial sectional view of a control device in accordance with the present invention; and FIGURE 2 illustrates, also schematically and in horizontal section, an accelerometer embodying the principles of the invention.

Referring to FIGURE 1, the device in its entirety is designated by reference numeral 10 and consists of means, such as an enclosure 12, for defining a chamber 14 having an inlet 16 and an outlet 18.

In the illustrated embodiment, enclosure 12 is of hollow cylindrical configuration and inlets 16 and 18 are coaxially located in the respective ends of the enclosure; however, is will be appreciated that these structural parameters are in no way critical.

Disposed within chamber 14 at a point intermediate inlet 16 and outlet 18 is a fluid-permeable partition 20 containing a multiplicity of minute apertures of a particular maximum size as will be explained presently. A body of liquid 22 is also disposed within chamber 14 at a location between partition 20 and outlet 18; in other words, on the outlet side of the partition.

For satisfactory performance and the achievement of the objects of this invention, a particular correlation of parameters must exist between the material of partition 20, the size of the apertures in the partition, the physical characteristics of liquid 22 (particularly its surface tension) and the pressure differential across the partition. While it is believed that surface tension is the principal characteristic involved, it will be understood that this is not the crux of the invention; useful combinations of parameters can be determined empirically.

First of all, liquid 22 and the material of partition 20 should be selected so that the former does not wet the latter. In addition, the size of the aperture must be small enough, with regard for the pressure differential across partition 20 that the surface tension of liquid 22 precludes it flowing through the apertures.

These requirements can be met, for example, by using mercury for the liquid and for partition 20, any of a wide variety of porous materials not wet by mercury and having a maximum pore size of, say 0.013 inch in diameter. With such a pore size, the partition is effectively sealed to reverse flow for back pressures of up to 1 inch of mercury. With a pore size of 0.0013 inch in diameter, the partition is sealed for back pressures of up to 10 inches of mercury, and with a pore size of 0.00013 inch diameter (3.3 microns) for 100 inches of mercury (about 50 p.s.i.g.). Among the commercially available porous materials which can be employed for partition 20 are porous ceramics, sintered powdered metal compacts, and the like. For additional information on such materials, reference may be made to U.S. Letters Patent No. 2,997,777.

While porous materials are convenient and well-suited for fabrication of partition 22, it will be understood that any structure which contains minute apertures or slits of suitable dimensions will serve the same purpose. Moreover, the precise number of apertures may be varied to achieve the desired flow rate. In certain applications a single aperture may be employed. In this case, the quantity of forward flow may be small enough that it passes through the body of liquid 22 in the form of a series of bubbles; the rate at which the bubbles are emitted, then, would constitute a digital output, i.e., the number of bubbles per unit of time would be a function of the pressure of the liquid at its interface with the partition relative to the gas inlet pressure.

For conventional operation as a one-way valve or pneumatic diode, device 10 is coupled by way of inlet 16 to a source of pressure or a preceding stage of a pneumatic computer circuit and outlet 18 is connected to an exhaust or succeeding circuit stage. Gas entering through inlet 16 passes through the pores or minute apertures in partition 20 and, assuming that the pressure of liquid 22 at its interface with partition 20 is less than the inlet pressure, bubbles up through the liquid and exhausts through outlet 18 (or accumulates in chamber 14 above the free surface of liquid 22).

However, when the outlet pressure exceeds the inlet pressure (a condition analogous to reverse-biasing an electronic diode) the liquid 22, prevented by its surface tension from passing through the pores or apertures in partition 20, effectively seals the partition against reverse flow.

From the immediate preceding description of the operation of device 10 as an asymmetrical flow device or diode, it will be seen that the same structure may be employed as an on-off flow control valve; the valve would be closed by applying, on the outlet side, a pressure greater than that extant at inlet 16. Thus, flow through the device is precluded until the outlet pressure is lowered.

It will also be understood that the device in FIGURE 1 is sensitive to acceleration, including acceleration due to gravity. Thus, in the position shown and when statically mounted, device 10 is "reverse-biased" by the earth's gravitational field acting on liquid 22; the amount of the bias can be increased by increasing the height of the liquid, and vice versa. Moreover, if the device is displaced vertically upward, liquid 22 acts as a seismic mass, its inertia effectively increasing the amount of reverse-bias so that the inlet pressure required to cause flow is proportionately increased. In other words, for inlet pressures above a threshold value, pressure and flow are functions of acceleration.

A particular embodiment of the principles of the invention in an accelerometer 30 is illustrated in FIGURE 2. Accelerometer 30 comprises, as its seismic mass, a body 32 of mercury or other suitable liquid, contained in a chamber defined by a hollow spherical enclosure 34 of porous material such as used for partition 20, FIGURE 1. At equiangularly spaced points on a great circle of enclosure 34 are four pressure taps 36, 38, 40, 42. These taps consist of respective tubular passages 36a, 38a, 40a, 42a extending radially outwardly from the interior of enclosure 34 and having respective spherical enlargements 36b, 38b, 40b, 42b intermediate their ends. The outer ends of all four passages are interconnected by means of an inlet manifold 44 to a common inlet pipe 46 which is connected to a suitable source of fluid under pressure.

The passages 36a, 38a, 40a and 42a on either side of the enlargements 36b, 38b, 40b and 42b in these respective passages, may contain metering orifices (not shown) at junctions with the enlargements. Respective pressure pickoffs 36c, 38c, 40c, 42c extend from the enlargements 36b, 38b, 40b, 42b.

In operation, the inlet fluid entering under pressure through pipe 46 is distributed by manifold 44 to pressure taps 36, 38, 40 and 42 and thence into the interior of sphere 34. Noting that taps 36, 38, 40 and 42 are all in the same horizontal plane, the flow rate through each should be substantially identical when the device is at rest. When subjected to acceleration, e.g., from left to right (as viewed in FIGURE 2) along the axis defined by taps 36 and 40, the inertia of mercury body 32 causes an increase in pressure in the region adjoining tap 36 and a decrease in the region of tap 40; consequently, flow through 36 decreases with a proportional increase in the pressure within enlargement 36b. At the same time, the flow through tap 40 increases with a concomitant decrease in pressure within enlargement 40b. The pressure changes within enlargements 36b and 40b are reflected in pressure pickoffs 36c and 40c, respectively. The pressures sensed by pickoffs 36c and 40c are utilized in a manner well-known in the art to generate an output representative of acceleration.

It will be understood that accelerations in the opposite direction along the axis of taps 36 and 40 as well as along the axis defined by taps 38 and 42 are read in a manner comparable to and readily apparent from the foregoing explanation of left-to-right acceleration along the 36, 40 axis. It will also be understood that acceleration along intermediate axes (e.g., at 45°) to both 36, 40 axis and the 38, 42 axis will generate components reflected in both pairs of pickoffs 36c, 40c and 38c, 42c.

Of course, a greater number of pickoffs may be used. A three-dimensional or "tri-axial" accelerometer can be constructed on the same principle and, in section, would appear substantially the same as the accelerometer shown in FIGURE 2; it would have a pair of pressure taps defining a third axis orthogonal to those defined by taps 36, 40 and 38, 42 and would receive inlet pressure fluid from the same inlet manifold 44.

While there has been described what at present are believed to be the preferred embodiments of this invention, it will be obvious to those skilled in the art that various modifications can be made therein within the scope of the invention, and it is intended that the appended claims cover all such modifications.

What is claimed is:

1. In a fluid flow control device for use as an acceleration sensor having wall means defining a chamber at least part of which is bounded by a fluid permeable wall containing a multiplicity of minute apertures of a predetermined maximum size; a body of liquid in said chamber contiguous to said permeable wall; means for introducing fluid under pressure into said chamber, said predetermined maximum size of the apertures being such in relation to the physical characteristics of said liquid and the pressure differential across the permeable wall that the liquid will be precluded by its surface tension from passing through the apertures in the wall, the improvement therein wherein said chamber is spherical in configuration and is bounded entirely by said fluid permeable wall and said fluid introducing means comprises a plurality of pressure taps symmetrically disposed about said sphere, arranged in diametrically opposed pairs, each tap including a passage extending through said wall means from the interior to the exterior of said chamber, a medial portion of said passage being enlarged and containing a pressure pickoff therein, said fluid introducing means further comprising a common inlet manifold interconnecting said passages exteriorly of said chamber, 2. A flow control device according to claim 1, wherein said liquid is mercury and said wall contains apertures having a maximum cross-sectional dimension less than 0.013 inch.

3. A flow control device according to claim 1, wherein said wall is constructed of a porous material and said apertures are the pores therein.

References Cited

UNITED STATES PATENTS

| | | | |
|---|---|---|---|
| 2,719,537 | 10/1955 | Gildersleeve | 137—251 |
| 2,834,366 | 5/1958 | Bond | 137—251 |
| 3,302,466 | 2/1967 | Ogren | 73—516 |

OTHER REFERENCES

IBM Technical Disclosure Bulletins, vol. 6. No. 11, April 1964, p. 34, and vol. 8, No. 3, August 1965, pp. 429-0.

JAMES J. GILL, Primary Examiner

U.S. Cl. X.R.

137—251